United States Patent
Liao et al.

(10) Patent No.: US 11,192,996 B2
(45) Date of Patent: Dec. 7, 2021

(54) RECYCLED PET FOAM MATERIAL AND METHOD FOR MANUFACTURING THE SAME

(71) Applicant: NAN YA PLASTICS CORPORATION, Taipei (TW)

(72) Inventors: Te-Chao Liao, Taipei (TW); Ching-Yao Yuan, Taipei (TW); Wei-Tang Liao, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 16/564,955

(22) Filed: Sep. 9, 2019

(65) Prior Publication Data

US 2020/0339777 A1  Oct. 29, 2020

(30) Foreign Application Priority Data

Apr. 25, 2019  (TW) ................. 108114517

(51) Int. Cl.
| | | |
|---|---|---|
| *C08J 9/04* | (2006.01) | |
| *C08L 67/02* | (2006.01) | |
| *C08J 9/14* | (2006.01) | |
| *C08J 9/12* | (2006.01) | |
| *C08K 5/098* | (2006.01) | |
| *C08K 3/36* | (2006.01) | |
| *C08K 5/00* | (2006.01) | |
| *C08K 3/26* | (2006.01) | |

(52) U.S. Cl.
CPC ............. *C08J 9/144* (2013.01); *C08J 9/122* (2013.01); *C08J 9/141* (2013.01); *C08K 3/26* (2013.01); *C08K 3/36* (2013.01); *C08K 5/005* (2013.01); *C08K 5/0083* (2013.01); *C08K 5/098* (2013.01); *C08L 67/02* (2013.01); *C08J 2201/03* (2013.01); *C08K 2003/265* (2013.01); *C08L 2203/14* (2013.01)

(58) Field of Classification Search
CPC ... C08J 9/144; C08J 9/141; C08J 9/122; C08J 2201/03; C08J 9/0023; C08J 9/0066; C08J 2203/06; C08J 2367/02; C08J 2300/30; C08J 9/0095; C08J 2203/08; C08L 67/02; C08L 2203/14; C08K 5/098; C08K 3/36; C08K 5/0083; C08K 5/005; C08K 3/26; C08K 2003/265; C08K 2003/3045; C08K 5/527; C08K 3/346; C08K 3/30; C08K 5/1345

See application file for complete search history.

(56) References Cited

U.S. PATENT DOCUMENTS

| | | | |
|---|---|---|---|
| 5,391,582 A † | 2/1995 | Muschiatti | |
| 5,693,681 A † | 12/1997 | Pfaendner | |
| 6,841,106 B1 * | 1/2005 | Fujimaki | ................ C08J 9/0023 264/102 |
| 2004/0108613 A1† | 6/2004 | Ma | |
| 2007/0059465 A1 * | 3/2007 | Thompson | ........... C08G 63/183 428/35.7 |

FOREIGN PATENT DOCUMENTS

| | | | |
|---|---|---|---|
| CN | 1325420 A | | 12/2001 |
| CN | 105131538 A | * | 12/2015 |
| EP | 0372846 A2 | † | 12/1989 |
| EP | 0866089 A1 | † | 9/1998 |
| EP | 2163577 A1 | † | 3/2010 |
| EP | 2253659 A1 | † | 11/2010 |
| EP | 2383309 A1 | † | 11/2011 |
| WO | 9010667 A1 | † | 9/1990 |

OTHER PUBLICATIONS

Data Sheet for Antioxidant 168. Chemical Book. (Year: 2021).*
Xanthos et al., Foam Extrusion of Polyethylene Terephthalate (PET), Foam Extrusions Principles and Practice, S.-T. Lee, Ed., Technomic Publishing Company Inc.,Chapter 12, pp. 307-338, 2000.†
Awaja et al., Recycling of PET, European Polymer Journal, 41, pp. 1453-1477, 2005.†

* cited by examiner
† cited by third party

*Primary Examiner* — Kara B Boyle
(74) *Attorney, Agent, or Firm* — Li & Cai Intellectual Property (USA) Office

(57) ABSTRACT

A recycled PET foam material and a manufacturing method thereof are characterized in that a recycled material can be used. The manufacturing method includes the following steps: uniformly mixing PET resin, chain extender, antioxidant, flame retardant and heat stabilizer, and then mixing with a twin-screw extruder to obtain a foam PET resin. The PET foaming material obtained is a material having the advantages of light weight, large rigidity, high specific strength, good electrical insulation, good sound insulation and the like, low raw material cost, simple manufacturing process and environmental protection.

8 Claims, No Drawings

RECYCLED PET FOAM MATERIAL AND METHOD FOR MANUFACTURING THE SAME

CROSS-REFERENCE TO RELATED PATENT APPLICATION

This application claims the benefit of priority to Taiwan Patent Application No. 108114517, filed on Apr. 25, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for producing a PET foaming material which enables PET to have a rheological property suitable for directly preparing a foaming product by a foaming process, and a manufacturing method using a supercritical fluid to foam.

BACKGROUND OF THE DISCLOSURE

Polyethylene terephthalate (PET) is a thermoplastic polyester material being largest in production and cheapest in price, with excellent physical, chemical and mechanical properties, as well as good resistance to organic solvents and weather. It is also widely used in the fields of fiber textile, film, and container manufacturing. In recent years, PET has become a promising material in the field of foaming materials. PET foaming materials have the advantages of light weight, high specific strength, high rigidity, good electrical insulation and good sound insulation, and thus can be used in food packaging, microwave containers, building materials, sports equipment, automobiles, aviation, aerospace and other fields. However, since PET is a semi-crystalline polymer with a linear molecular chain structure, PET can only flow at a temperature higher than a melting point during processing. At this time, melt strength and melt viscosity of the PET melt are small, and at high temperature, PET is easily degraded, resulting in a decrease in molecular weight, further deterioration of melt rheology, and inability to support the growth and shaping of cells in its matrix. Therefore, conventional PET cannot obtain good cell foam material during foaming.

It is important to improve the melt strength of PET, and the main factors affecting the melt strength of PET are the molecular weight, molecular weight distribution and long-chain branching degree of PET. Therefore, PET should be modified by increasing the molecular weight of PET, broadening the molecular weight distribution and increasing a degree of long chain branching.

At present, a reaction melt extrusion method or a blending method is mainly used to prepare high melt strength PET, and the chemical chain extender is used in the molten state to carry out chain extension reaction with the end group of the PET molecule, thereby increasing the molecular weight of the PET and an intrinsic viscosity of PET so as to meet requirements for processing.

Conventional polymer foaming methods can be divided into physical foaming methods and chemical foaming methods. Although the application of the chemical foaming method is very common, with the rise of environmental awareness in recent years, physical foaming methods using supercritical fluids (such as carbon dioxide, nitrogen, hydrocarbons, and fluorocarbons) as a foaming agent have received widespread attention, and methods such as injection molding, extrusion molding, and intermittent molding have been derived therefrom.

SUMMARY OF THE DISCLOSURE

In response to the above-referenced technical inadequacies, the present application provides a recycled PET foam material suitable for extrusion molding in a supercritical fluid, the composition of the recycled PET foam material includes the following components:

1. 86 to 98.3 wt % of recycled PET, its relative density is 1.35 to 1.40 g/cm$^3$, melting point is 250 to 260° C., intrinsic viscosity (IV) is 0.55 to 0.95 dL/g, and a source is a recycled PET material.

2. 1-10 wt % of chain extender, selected from a tetracarboxylic acid, a polycarboxylic acid aromatic hydrocarbon or a dianhydride and polyepoxide of a fatty acid, for example, one or any combination of 2,2,4,4-diphenyltetracarboxylic acid, 3,3,4,4-benzophenonetetracarboxylic acid, pyromellitic dianhydride, cyclopentane tetracarboxylic acid, tetrahydrophthalic acid diglycidyl ester, and glycerol diglycidyl ether.

3. 0.1 to 1.0 wt % of antioxidant, selected from one or any combination of pentaerythritol tetrakis(3,5-di-tert-butyl-4-hydroxy)phenylpropionate, phenyl tris(2,4-di-tert-butyl) phosphite and 3-(3,5-di-tert-butyl-4-hydroxyphenyl)propanoic acid stearyl alcohol ester.

4. 0.5 to 2.0 wt % of nucleating agent, selected from one or any combination of barium sulfate, calcium citrate, calcium carbonate and talcum powder.

5. 0.1 to 1.0 wt % of heat stabilizer, selected from various commonly used phosphorus compound stabilizers, preferably triphenyl phosphite or triethylene thiophosphate, wherein a melting point of triphenyl phosphite is 22 to 24° C., relative molecular weight is 310.3, density is 1.184 g/cm$^3$; triethylene thiophosphoric acid amine has a melting point of −40° C. and a density of 0.998 g/cm$^3$.

A foaming agent used in a foaming step is a commonly used foaming agent such as nitrogen, carbon dioxide, hydrocarbons and fluorocarbons.

The PET is used as a main material; the chain extender is used to increase a melt strength of the material; the antioxidant is used to reduce an oxidation of the material in processing steps; the nuclear agent is used to provide the location where a supercritical fluid forms the nucleus; the heat stabilizer is used to improve a heat resistance of the material.

In one aspect, the present disclosure provides a method for manufacturing a recycled PET foam material, including the following steps:

Step 1: weighing 86 to 98.3 wt % of recycled PET, 1 to10 wt % of chain extender, 0.1 to 1.0 wt % of antioxidant, and 0.5 to 2.0 wt % of nucleating agent;

Step 2: vacuum drying the PET at 140° C. for 12 hours, and drying the chain extender, the antioxidant, the nucleating agent, and the heat stabilizer at 80° C. for 8 hours;

Step 3: mixing the recycled PET in portion, the chain extender, the antioxidant, the nucleating agent, and the heat stabilizer, stirring in a high-speed mixer for 10 minutes, and then putting into a foaming extruder; and Step 4: controlling heating conditions of the foaming extruder, a temperature in a first zone at 290-300° C., a temperature in a second zone is 280-300° C., a temperature in a third zone at 275-295° C., and a temperature in a fourth zone at 275-295° C., a temperature in a fifth zone at 260-280° C., a die temperature at 250-280° C., a screw speed is 30-100 rpm, and a foaming gas is fed at a rate of 0.5 to 3 kg/hr for foaming.

Therefore, the method for manufacturing a recycled PET foam material of the present disclosure maintains good processability, weather resistance, and chemical resistance of PET, improves the processability of PET, and particularly has excellent heat resistance.

In the present disclosure, the recycled PET waste material and the chain extender, the antioxidant, the nucleating agent and the heat stabilizer are mixed together, thereby solving the problem of degradation of the recycled PET waste material when processing, and giving the PET good foaming performance to be used for preparing a PET foaming product.

The present disclosure adopts the recycled PET waste material as a raw material, and prepares a foaming PET resin through a twin-screw extruder, which has the advantages of low cost, simple manufacturing process and easy industrial production.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiment 1

The recycled PET foam material of the embodiment 1 is made by the following raw materials and the total of each component is 100% by weight:

96.5 wt % of recycle PET, 2.0 wt % of chain extender, 0.5 wt % of antioxidant, 0.5 wt % of nucleating agent, and 0.5 wt % of heat stabilizer.

The manufacturing method is as follows:

1. The recycle PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: nitrogen, fed at a rate of 1 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Embodiment 2

The recycled PET foam material of the embodiment 2 is made by the following raw materials and the total of each component is 100% by weight:

91.5 wt % of recycle PET, 7.0 wt % of chain extender, 0.5 wt % of antioxidant, 0.5 wt % of nucleating agent, and 0.5 wt % of heat stabilizer.

The manufacturing method is as follows:

1. The recycle PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: nitrogen, fed at a rate of 1 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Embodiment 3

The recycled PET foam material of the embodiment 3 is made by the following raw materials and the total of each component is 100% by weight:

90.0 wt % of recycle PET, 7.0 wt % of chain extender, 0.5 wt % of antioxidant, 0.2 wt % of nucleating agent, and 0.5 wt % of heat stabilizer.

The manufacturing method is as follows:

1. The recycle PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: nitrogen, fed at a rate of 1 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Embodiment 4

The recycled PET foam material of the embodiment 4 is made by the following raw materials and the total of each component is 100% by weight:

96.5 wt % of recycle PET, 2.0 wt % of chain extender, 0.5 wt % of antioxidant, 0.5 wt % of nucleating agent, and 0.5 wt % of heat stabilizer.

The manufacturing method is as follows:

1. The recycle PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: carbon dioxide, fed at a rate of 1.2 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Embodiment 5

The recycled PET foam material of the embodiment 5 is made by the following raw materials and the total of each component is 100% by weight:

91.5 wt % of recycle PET, 7.0 wt % of chain extender, 0.5 wt % of antioxidant, 0.5 wt % of nucleating agent, and 0.5 wt % of heat stabilizer.

The manufacturing method is as follows:

1. The recycle PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: carbon dioxide, fed at a rate of 1.2 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Embodiment 6

The recycled PET foam material of the embodiment 6 is made by the following raw materials and the total of each component is 100% by weight:

90.0 wt % of recycle PET, 7.0 wt % of chain extender, 0.5 wt % of antioxidant, 2.0 wt % of nucleating agent, and 0.5 wt % of heat stabilizer.

The manufacturing method is as follows:

1. The recycle PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: carbon dioxide, fed at a rate of 1.2 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Comparative Example 1

A foamable PET resin of the comparative example 1 is made by the following raw materials and the total of each component is 100% by weight:

90.0 wt % of general PET, 7.0 wt % of chain extender, 0.5 wt % of antioxidant, 2.0 wt % of nucleating agent, and 0.5 wt % of heat stabilizer.

The manufacturing method is as follows:

1. A general PET material is vacuum dried at 140° C. for 12 hours.

2. The chain extender, antioxidant, nucleating agent, heat stabilizer are vacuum dried at 80° C. for 8 hours.

3. The above raw materials are mixed in proportion according to the parts by weight, placed in a high-speed mixer for 10 minutes, and then put into a twin-screw foaming extruder.

Foaming gas: carbon dioxide, fed at a rate of 1.2 kg/hr.

Extrusion temperature of extrusion machine: 295° C. in a first zone, 290° C. in a second zone, 285° C. in a third zone, 285° C. in a fourth zone, and 270° C. in a fifth zone.

Screw speed: 45 rpm.

Die temperature: 265° C.

Table 1 lists embodiments and comparative example of the recycled PET foam material of the present disclosure. Comparative analyses are carried out on the foaming materials prepared in embodiments 1-6 and comparative example 1:

Compared with embodiment 4, in comparative example 1, the general PET material is used and a large amount of nucleating agent is added therein, such that the average size of cells can be effectively reduced, and a specific gravity after foaming is much better than that of embodiment 4.

Compared with comparative example 1, in embodiment 6 the recycle PET material is used and a large amount of chain extenders is added therein, such that the melting strength of PET resin can be effectively increased, and a specific gravity after foaming is much better than that of comparative example 1.

TABLE 1 weight composition and material properties of the materials of embodiments 1-6 and comparative example 1

| Composition (wt %) | Embodiment 1 | 2 | 3 | 4 | 5 | 6 | Comparative example 1 |
|---|---|---|---|---|---|---|---|
| Recycle PET | 96.5 | 91.5 | 90.0 | 96.5 | 91.5 | 90.0 | |
| General PET | | | | | | | 95.0 |
| Chain extender | 2.0 | 7.0 | 7.0 | 2.0 | 7.0 | 7.0 | 2.0 |
| Antioxidant | 0.5 | 0.5 | 0.5 | 0.5 | 0.5 | 0.5 | 0.5 |
| Nucleating agent | 0.5 | 0.5 | 2.0 | 0.5 | 0.5 | 2.0 | 2.0 |
| Heat stabilizer | 0.5 | 0.5 | 0.5 | 0.5 | 0.5 | 0.5 | 0.5 |
| Foaming gas | Nitrogen | Nitrogen | Nitrogen | Carbon dioxide | Carbon dioxide | Carbon dioxide | Carbon dioxide |
| Thickness(mm) | 2.2 | 2.3 | 2.2 | 2.3 | 2.3 | 2.4 | 2.3 |
| Specific gravity (g/cm³) | 0.521 | 0.388 | 0.320 | 0.508 | 0.137 | 0.123 | 0.121 |
| Average size of cells (μm) | 223 | 125 | 72 | 232 | 134 | 62 | 67 |

According to Table 1, adding more nucleating agents can effectively reduce the average size of cells, and adding more chain extenders can effectively increase the melting strength of PET resin, so that the specific gravity of PET foaming products reduces.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A recycled PET foam material, comprising:
   1) 86 to 98.3 wt % of a recycled PET;
   2) 1 to 10 wt % of chain extender which is 2,2,4,4-diphenyltetracarboxylic acid;
   3) 0.1 to 1.0 wt % of antioxidant;
   4) 0.5 to 2.0 wt % of nucleating agent; and
   5) 0.1 to 1.0 wt % of heat stabilizer.

2. The recycled PET foam material according to claim 1, wherein the recycled PET has a relative density of 1.35 to 1.40 g/cm³, a melting point of 250 to 260° C., and an intrinsic viscosity of 0.55 to 0.95 dL/g.

3. The recycled PET foam material according to claim 1, wherein the antioxidant is selected from one or any combination of pentaerythritol tetrakis(3,5-di-tert-butyl-4-hydroxy)phenylpropionate, phenyl tris(2,4-di-tert-butyl)phosphite and 3-(3,5-di-tert-butyl-4-hydroxyphenyl)propanoic acid stearyl alcohol ester.

4. The recycled PET foam material according to claim 1, wherein the nucleating agent is selected from one or any combination of barium sulfate, calcium citrate, calcium carbonate and talcum powder.

5. The recycled PET foam material according to claim 4, wherein the calcium citrate has an average particle diameter from 3 μm to 8 μm, and the talcum powder has an average particle diameter from 1 μm to 4 μm.

6. The recycled PET foam material according to claim 1, wherein the heat stabilizer is a phosphorus compound stabilizer.

7. A method for manufacturing a recycled PET foam material, comprising:
   Step 1: weighing 86 to 98.3 wt % of a recycled PET, 1 to 10 wt % of 2,2,4,4-diphenyltetracarboxylic acid being a chain extender, 0.1 to 1.0 wt % of antioxidant, 0.1 to 1.0 wt % of a heat stabilizer, and 0.5 to 2.0 wt % of nucleating agent, and the total of each component is 100% by weight;
   Step 2: vacuum drying the PET at 140° C. for 12 hours, and drying the chain extender, the antioxidant, the nucleating agent, and the heat stabilizer in the vacuum at 80° C. for 8 hours;
   Step 3: mixing the in portion recycled PET, the chain extender, the antioxidant, the nucleating agent, and the heat stabilizer, stirring in a high-speed mixer for 10 minutes, and then putting into a foaming extruder; and
   Step 4: controlling heating conditions of the foaming extruder, a temperature in a first zone at 290-300° C., a temperature in a second zone at 280-300° C., a temperature in a third zone at 275-295° C., and a temperature in a fourth zone at 275-295° C., a temperature in a fifth zone at 260-280° C., a die temperature at 250-280° C., a screw speed is 30-100 rpm, and a foaming gas is fed at a rate of 0.5 to 3 kg/hr for foaming.

8. The method for manufacturing a recycled PET foam material according to claim 7, wherein the foaming gas is selected from one or any combination of nitrogen, carbon dioxide, hydrocarbons, and fluorocarbons.

* * * * *